United States Patent Office 3,573,254
Patented Mar. 30, 1971

3,573,254
REDUCTIVE CAPPING OF POLY(PHENYLENE OXIDES)
Arnold Factor, Scotia, N.Y., assignor to General Electric Company
No Drawing. Filed Dec. 23, 1968, Ser. No. 786,475
Int. Cl. C08g 23/22
U.S. Cl. 260—47                9 Claims

ABSTRACT OF THE DISCLOSURE

Poly(phenylene oxides) having improved optical clarity are prepared by treating a solution of the polymer with aluminum, cadmium, magnesium, tin or zinc, prior to or simultaneously with the capping reaction, whereby the hydroxyl groups of the polymer are converted to substituents which are substantially inert to oxygen attack at elevated temperatures. Still further improvement in clarity is obtained when a carboxylic acid soluble in the reaction mixture is used in conjunction with zinc and especially, when this treatment is carried out simultaneously with a hot-capping process, which generates and caps any incipient hydroxyl groups on the polymer chain.

---

This invention relates to an improved capping process for poly(phenylene oxides). More particularly, this invention relates to a decolorization or reduction step to improve the optical clarity of the polymers which is carried out prior to or simultaneously with the known capping processes to convert the hydroxyl groups to substituents which are substantially inert to oxygen attack at elevated temperatures. Still more particularly, this invention relates to the improvement in the process of capping poly(phenylene oxides) which comprises treating solutions of poly(phenylene oxides) with a reducing agent comprising metal selected from the group consisting of aluminum, cadmium, magnesium, tin and zinc, prior to or simultaneously with the capping reaction, i.e., no later than the capping reaction. The optimum results are obtained when zinc is used in conjunction with a carboxylic acid soluble in the reaction mixture and especially, when such treatment is carried out simultaneously with a hot-capping procedure which not only caps the hydroxyl groups normally present in the polymer but also generates and caps incipient hydroxyl groups.

Poly(phenylene oxides), sometimes called polyphenylene ethers, as a general class, are an extremely interesting group of new polymers. These polymers, both homopolymers and copolymers of two or more phenols, and processes for producing them are disclosed in U.S. Patents 3,306,874, 3,306,875, and 3,432,466 are incorporated herein by reference. These poly(phenylene oxides) have many desirable properties and have found wide commercial acceptance. Generally, these poly(phenylene oxides) are poly(2,6-disubstituted-1,4-phenylene oxides) which are made by oxidative coupling of 2,6-disubstituted phenols.

For high temperature applications in the presence of air or other oxygen containing gas, it has been found that these poly(phenylene oxides) preferably should be capped, i.e., have the hydroxyl groups, generally present as an end group on one end of the polymer molecule, converted to a substituent which is oxidatively stable. This can be done by any of the well-known general procedures used for capping hydroxyl-terminated polymers, but preferably by hot-capping as disclosed and claimed in U.S. Patent 3,375,228, Holloch and Van Sorge, which also develops and caps any incipient hydroxyl groups. Basically, poly(phenylene oxides) are colorless, i.e., water-white, polymers. However, due to the oxidative coupling reaction by which these polymers are made and the fact that the phenols from which the polymers are made are somewhat subject to oxidative attack, color bodies or chromophores are generated during the polymer forming process. The oxidative coupling reaction is capable of producing either poly(phenylene oxides) or diphenoquinones. By varying the reaction conditions, it is possible to produce poly(phenylene oxides) in very high yields with only a very minor amount of the corresponding diphenoquinone. These diphenoquinones are generally quite insoluble in the reaction mixture and therefore are removed by filtration. However, some diphenoquinones may be sorbed or incorporated in the polymer molecule. Other secondary reactions also occur which produce color bodies in the polymer body, i.e., chromophores or chromophore-engendering bodies (causing color to be developed later, for example, when heated) which can be due to the amine moiety of the catalyst used which becomes sorbed or incorporated into the polymer molecule. Some of these reactions may be due to small amounts of impurities in the starting phenol.

Generally, the chromophores and chromophore-engendering bodies are undesirable in the polymer unless a particular color is desired. Hydroxyl, amino and carbonyl groups generally contribute to some of the degradation of the polymer when exposed to high temperatures. Therefore, it would be particularly desirable to eliminate these substituents in order to improve both color and stability of the poly(phenylene oxides).

As mentioned above, the hydroxyl groups present in the polymer can be conveniently converted to inert substituents, for example, esters, ethers, urethanes, etc., by means of acyl halides, acid anhydrides, isocyanates, alkylene oxides, or other reagents known to react with hydroxyl groups. As fully disclosed and calimed in the above mentioned U.S. Patent 3,375,228, it is also highly desirable to generate and cap any incipient hydroxyl groups which may be present in the polymer molecule, by a hot-capping procedure. While this hot-capping procedure is extremely effective in producing improved poly(phenylene oxides), it does have one disadvantage, in that the polymers are somewhat more discolored than the starting polymer, but this disadvantage is outweighed by the fact that the polymers are more stable and do not discolor as rapidly as the uncapped polymer when subjected to an oxidizing atmosphere at elevated temperatures and therefore, are not as discolored as the uncapped polymer after a given exposure period to elevated temperatures. However, it would be highly desirable to be able to produce a polymer which is initially improved in color and maintains this advantage on subsequent exposure to oxidizing atmospheres at elevated temperatures for an extended period of time.

I have found that the color of the polymer solutions is substantially diminished if solutions of poly(phenylene oxides) are contacted with aluminum, cadmium, magnesium, tin or zinc, even at ambient room temperature conditions. An even more rapid and more complete decolorization of the polymer is effected when zinc is used in combination with a carboxylic acid which is soluble in the reaction mixture. This decrease in the color of the polymer is permanent as long as the polymer is not subjected to temperatures substantially above 100–125° C. For example, if the polymer is solution-cast into films or wet-spun into fibers, such objects will have an improved color over films or fibers prepared in the same manner from the same polymer which has not been treated with the above reducing agents. However, if such films or fibers are subjected to temperature of 150° C. or higher for an extended period or are used as molding compositions which require temperatures in the neighborhood of 250° C,. and higher, there is substantially no difference between these objects whether prepared from the reduced polymer or the untreated polymer. I have also noted that if the solution of the reduced polymer is separated from the metal and shaken vigorously with air for an extended period of time, the initial color of the polymer will return. Because of this, the reduced polymer should be kept in contact with the reducing agent, at least until the polymer is capped. Furthermore, the capping reaction is preferably carried out in an inert atmosphere and preferably in the presence of the reducing agent.

If the solution of the decolorized polymer has its hydroxyl groups capped, either by conventional capping procedures or by the hot-capping procedure, the improvement in color is still retained over similarly capped, but not decolorized polymer when subjected to elevated temperatures. Since exposure to elevated temperatures will generate incipient hydroxyl groups, if they have not been generated by using the hot-capping procedure and these generated hydroxyl groups can cause color formation during subsequent exposures to an oxygen atmosphere at elevated temperatures, the best improvement in color is obtained by hot-capping the decolorized polymer either subsequent to, but preferably simultaneously with the reducing step.

The exact reaction or function of the metal which causes reduction of the color of the polymer is not known. The metal may cause an actual chemical reduction of the chromophores and chromophore-engendering groups in the polymers or it may be reacted with these groups to form colorless derivatives. Regardless of whether it is a decolorizing reaction due to some physical phenomena or an actual chemical reduction, I refer to it as a reductive step and to the overall process as reductive capping when my process is used in conjunction with any capping process and as reductive hot-capping when my process is used in conjunction with the hot-capping process. It is more than simply a reduction due to the reducing power of the metal since much more active reducing metals, for example, sodium, either in the form of wire, in the presence or absence of alcohol, sodium amalgam or sodium-lead alloy, in the presence or absence of alcohol are not effective. Furthermore, reducing agents which do produce some decolorization of the polymer such as, hypophosphorous acid, phosphite salts, hydrazine, etc., are nowhere near as effective as my reducing agents. Furthermore, the effect obtained with the combination of zinc and a carboxylic acid can not be explained merely on the basis of generation of nascent hydrogen, since the other metals, which I have found effective, give better results when used alone than they do in the presence of a carboxylic acid. Iron and copper, either in the form of metal or salts are very detrimental to the color of poly(phenylene oxides), especially during the hot-capping reaction.

The treatment with my reducing agents can be carried out in a wide variety of ways. Since the poly(phenylene oxides) are prepared by oxidatively coupling of phenols in solution in the presence of a basic cupric salt-amine complex, it is necessary to remove the catalyst from the polymer. Generally, one of two methods is used. Either the catalyst is deactivated by acidification followed by precipitation of the polymer leaving the catalyst in solution or the catalyst is extracted from the polymer solution. Since the treatment with my reducing agents requires that the polymer be in solution, the preferred procedure to be used in conjunction with my process is to remove the catalyst from the polymer solution. This is very conveniently done by washing the polymer solution with an aqueous acetic acid solution which extracts the catalyst and amine into the aqueous layer as soluble salts, followed by washing with water to remove any of the soluble salts and acid remaining dissolved in the organic layer. If desired, the polymer solution can then be treated with a solid dessicant to remove any water dissolved in the organic phase, when it is desired to conserve a capping agent which is reactive with water. The solution is then ready to be decolorized with the reducing agent.

The treatment with the reducing agents can be carried out in a wide variety of ways. It may be stirred or shaken with the desired metal, preferably, in finely divided form or the solution of the polymer may be slowly passed over a static, stirred or fluidized bed of the metal at a rate so chosen to give the required contact time with the metal to obtain the desired degree of decolorization. This reaction can be carried out at room temperature conditions or at elevated or below room temperatures, the speed of decolorization increasing with an increase in temperature. Temperatures up to the reflux temperature of the ambient pressure existing over the solution may be used if desired.

Thereafter, the solution can be removed from presence of the metal and the hydroxyl groups of the polymer capped by reacting with any reagent known to be capable of reacting with hydroxyl groups. These include, but are not limited to, esterifying agents, for example, acyl halides, acid anhydrides, ketenes, etc., reagents, for example, dialkyl sulfates, alkyl and aryl halides, etc., miscellaneous capping reagents, for example, isocyanates, alkylene oxides, etc. The particular capping agent used forms no part of this invention. Any known capping agents and known processes of capping hydroxyl groups are effective in capping the improved reduced polymers.

Since even better optical clarity are obtained by carrying out the capping reaction in the presence of the reducing agent, the preferred method, is to simultaneously treat the solution of the polymer with the reducing agent and the capping agent. This simultaneous reaction can likewise be carried out either in a batch or continuous process as described above.

Since all of the metals which I have found useful as reducing agents are capable of displacing copper from the polymer solution, I can, if desired, deactivate the copper catalyst of the polymer solution as prepared, by bringing the polymer solution into contact with the metal. However, since that portion of the metal containing displaced copper should be absent during the capping reaction if carried out at elevated temperatures, either the capping reaction should be carried out after removal of the copper containing metal, with or without the addition of fresh metal as desired. If a static bed of metal particles are used, the fore end of the column where all of the copper would be concentrated should not be maintained at elevated temperatures. Fresh metal can then be added at the other end of the column, gradually displacing the metal containing copper, as the copper concentration increases in the fore end.

Where zinc and a carboxylic acid soluble in the reaction mixture are to be used, several obvious variations in procedure are possible. The zinc and the acid, as well as the capping agent, if it is non-reactive with the carboxylic acid, may be added to the raw polymer solution still containing the copper amine catalyst to deactivate the copper catalyst. This decolorization reaction occurs so rapidly at ambient temperature, that it generally proceeds much faster than the capping reaction. If the capping reaction is to be carried out at room temperature, the zinc contaminated with copper does not need to be removed. However, if the capping reaction is to be carried out at elevated temperatures, especially, the hot-capping reaction which is carried out at elevated temperatures generally under pressure, then the zinc contaminated with copper must be removed, being replaced with fresh zinc if the capping reaction is to be carried out in the presence of the zinc, to obtain still further improved results.

The preferred procedure is to treat the raw polymer solution containing the copper-amine catalyst with an aqueous solution of the carboxylic acid to be used in conjunction with the zinc. This extracts the copper salt and amine into the aqueous layer with sufficient of the carboxylic acid staying dissolved in the organic layer to be effective with the zinc which is added after removal of the aqueous acid layer containing the extracted copper. Several washings with the aqueous carboxylic acid can be used to insure complete removal of the copper and amine, prior to addition of the zinc, which is then added along with additional carboxylic acid if desired, and the capping agent if it is non-reactive with carboxylic acid and it is desired to carry out the capping reaction simultaneously with the reduction reaction.

The reaction mixture is allowed to proceed as described above, using either ambient or elevated temperatures and followed by the capping reaction, if the capping agent has not been added to the polymer solution, prior to reduction. By using the polymer solution, washed with carboxylic acid, and also containing the capping agent, if desired, the polymer solution may be brought in contact with either a stationary or fluid bed of metal, so that the capping and reduction reaction can be carried out simultaneously over a fixed bed of zinc.

As mentioned previously, hot-capping of the reduced polymer is preferred and additionally, it is preferred that the metal be present during the hot-capping reaction. The hot-capping reaction is carried out as disclosed and claimed in the above-referenced U.S. Patent 3,375,228—Holloch and Van Sorge. This hot-capping reaction is generally carried out at elevated temperatures in excess of 120° C., and preferably at temperatures from 200° to 340° C. When the temperature is higher than the boiling point of the solution at atmospheric pressure, the reaction is carried out in an autoclave generally at the autogenous pressure created by the reaction mixture at the temperature used. Higher pressures can be used if desired.

The amount of reducing agent is not critical. Very small amounts of my reducing agent, from .01 to 1%, by weight based on the weight of the polymer are very effective for the reduction reaction. However, for smaller amounts longer reaction times are required because of the reduced surface area available. Since only very little of either the metal or the carboxylic acid, if used, is consumed during the reaction, excess amounts, up to 30 to 50% by weight based on polymer can be used since they are not only inexpensive but also are readily recoverable and can be used in subsequent reactions. In a flow-through system, where a stream of the polymer solution passes over the metal, still higher amounts of the metal can be present.

Although, any carboxylic acid which is soluble in reaction mixture can be used, when it is desired to use one, i.e., especially with zinc, there is no advantage to be gained by using the higher alkanoic acids, since they are expensive and not as readily available. Therefore, the preferred alkanoic acids are the alkanoic acids of the lower alkanoic acids having up to from 1 to 8 carbon atoms. Of these, the preferred are those having from 2 to 4 carbon atoms since they are more readily available and extremely effective. Formic acid is not as effective as acetic acid. Substituents on the alkanoic acids also do not add to their effectiveness, therefore, there is no incentive to using substituted alkanoic acids. Of the aromatic carboxylic acids, the only readily available one which is soluble in the reaction mixture is benzoic acid. Therefore, the preferred group of acids are the lower alkanoic acids and benzoic acid.

Likewise, the particular capping agent is not critical. Any of the reagents which are capable of reacting with hydroxyl groups may be used. However, since they are all equivalent in their ability to effectively cap the poly(phenylene oxides), the choice is optional. Since acetic anhydride is very effective, the most readily available and the cheapest of all the capping agents and forms acetate esters with the hydroxyl group, which are very oxidative resistant, it is the preferred capping agent to be used.

In order that those skilled in the art may readily understand my invention, the following examples are given by way of illustration and not by way of limitation. In all of the examples, parts are by weight unless stated otherwise, temperatures are given in degrees centigrade and intrinsic viscosities are given in units of dl./g., measured in chloroform at 25° C.

EXAMPLE 1

As a standard, a 2% solution of poly(2,6-dimethyl-1,4-phenylene oxide) in benzene was prepared. Separate portions of this solution were treated with powdered metals, both with and without the presence of acetic acid. Although a noticeable color change occurred overnight, and almost instantaneous with zinc and acetic acid, the solutions were allowed to stand at room temperature with occasional shaking for 7 days to insure the maximum effect of this treatment. At the end of this time, the light transmission of a carefully decanted portion of the supernatant liquid from each of these solutions was measured with monochromatic light having a wavelength of 400 m$\mu$. This light is in the region of maximum absorbancy for the polymer in the visible spectrum.

The results are shown in Table I.

TABLE I

| Reducing agent: | Percent transmission |
| --- | --- |
| Al | 76 |
| Al and acetic acid | 71 |
| Cd | 85 |
| Cd and acetic acid | 79 |
| Mg | 79 |
| Mg and acetic acid | 78 |
| Sn | 74 |
| Sn and acetic acid | 65 |
| Zn | 79 |
| Zn and acetic acid | 90 |
| None | 70 |

It will be noted that cadmium, magnesium and zinc are the three best metals when used above with cadmium being the best of all. However, it will also be noted that of all the metals, zinc is unique in that when used in conjunction with acetic acid, it showed a marked improvement whereas the other metals are best used alone. The additional improvement obtained with zinc and acetic acid together gave results which were far better than obtained with any of the other metals. Example 2 shows that this effect is also obtained when zinc is used with other alkanoic acids and benzoic acid.

EXAMPLE 2

Using the same polymer solution and procedure of Example 1, the results shown in Table II were obtained when the listed acids were used with zinc powder.

TABLE II

| Reducing agent: | Percent transmission |
| --- | --- |
| Formic acid | 86 |
| Acetic acid | 90 |
| Propionic acid | 91 |
| Isobutyric acid | 90 |
| Benzoic acid | 86 |

Similar results are also obtained when the other lower alkanoic acids were used in place of the above acids and also when other poly(phenylene oxides) were used in place of the poly(2,6-dimethyl-1,4-phenylene oxide).

EXAMPLE 3

Separate portions of an approximately 30% solution of poly(2,6-dimethyl-1,4-phenylene oxide) in toluene were placed in glass tubes and acetic anhydride and one of the following reducing agents added to each tube except one which was used as a control. After sealing the tubes under vacuum while cooled in liquid nitrogen, and after being allowed to warm to ambient conditions, they were placed in a pressure vessel and heated at 230° C. for 30 muintes. After cooling, the polymer was precipitated from the filtered solution by pouring into methanol. The polymer was washed and dried. Discs, 15 mils thick were molded at 270° C. The percent light transmission for broad spectrum visible light (fluorescent light bulb) was measured. The results are shown in Table III.

TABLE III

| Reducing agent: | Percent transmission |
|---|---|
| None | 60 |
| Al | 73 |
| Cd | 82 |
| Mg | 80 |
| Sn | 74 |
| Zn | 87 |
| Zn and acetic acid | 90 |

To recheck the effect of acid with the metals other than Zn, the above procedure was repeated for Cd in the presence of acetic acid. Again, the results with Cd alone were better than when Cd was used with the acid. When the treatment with zinc and acetic acid was carried out at ambient temperature, followed by the hot-capping procedure with acetic anhydride, in the absence of zinc, and also when the polymer solution was capped at ambient room temperature, in the absence of zinc, with acetic anhydride in the presence of pyridine, a molded disc of the polymer in both cases, had 85% light transmission showing that treatment with zinc and acid is not necessary during the capping reaction but is desired when maximum improvement in color is required. When the polymer was first hot-capped with acetic anhydride and then the solution treated with zinc and acetic acid, the polymer was not decolorized to anywhere near the amount as obtained by treatment prior to the hot-capping procedure, e.g., a 4% solution of hot-capped polymer which gave 55% transmission at 425 mμ gave 70% transmission after reduction with zinc and acetic acid. (Similar measurements on untreated polymer giving 78% transmission.) These results demonstrate that the decolorizing procedure must be prior to, and preferably, simultaneously with the capping procedure.

EXAMPLE 4

This example shows that the molecular weight as indicated by intrinsic viscosity is not affected by either the decolorization treatment or by the hot-capping procedure. A solution of 25 g. of poly(2,6-dimethyl-1,4-phenylene oxide), having an intrinsic viscosity of 0.49, in 250 ml. of toluene alone with 25 g. of zinc powder, 25 ml. of acetic anhydride and 12.5 ml. of acetic acid was placed in a 1 liter stainless steel autoclave equipped with a stirrer. The autoclave was purged with nitrogen to supply an inert atmosphere and closed. The reaction mixture was heated at 240–255° C., for 25 minutes under autogenous pressure. The polymer was precipitated from the filtered reaction mixture by pouring into methanol followed by filtration, washing and drying. This polymer had an intrinsic viscosity of 0.48 dl./g. The compression molded disc of this material, 15 mils thick, had a light transmission of 91–92%.

EXAMPLE 5

Poly(2,6-diphenyl-1,4-phenylene oxide) is typical of a polyphenylene ether having 2 aryl substituents. Such polymers are basically more thermally stable than the poly(phenylene oxides) having alkyl substituents. However, they likewise are benefitted by my treatment as illustrated in this example. Using the procedure of Example 3, poly(2,6-diphenyl-1,4-phenylene oxide) having an intrinsic viscosity of 0.82, was treated with zinc powder, acetic acid and acetic anhydride in a sealed tube by the procedure of Example 3. Intrinsic viscosity of the isolated polymer was 0.79, and the polymer was noticeably whiter than the starting polymer, and had a light transmission of 89% compared to 85% for the untreated polymer.

EXAMPLE 6

This example illustrates that my process is also applicable to poly(phenylene ethers) which contain substituents in the side chain which impart improved thermal stability to the polymers. A copolymer was made by oxidative coupling, a mixture of 2,6-dimethyl phenol containing 1.75 mole percent of 2-methyl-6-(α-phenylethyl)phenol. One portion of this copolymer was used as a control and only hot-capped, while the other portion was hot-capped in the presence of zinc and acetic acid by the procedure of Example 3. A 15 mil thick molded disc was prepared from each of these capped polymers. The control had a light transmission of 80% while the other had a light transmission of 90%. After heat-aging for 130 hours at 175°, the light transmission of the reduced, hot-capped polymer was more than twice the light transmission of the control. A further increase in heat stability was obtained by the incorporation of 1% by weight of a commercially available stabilizer, 2(2'-hydroxy-5'-methylphenyl)benzotriazole.

The poly(phenylene oxides) of this invention can be used in all the known applications for poly(phenylene oxides) disclosed in the above referenced patents, for example, as molding compositions to produce shaped molded articles, to make fibers and films which can be crystal-oriented if desired, using solution or melt-spinning and casting techniques. Because of their improved clarity, as demonstrated above, they are particularly useful in making the above objects which make use of this property. Because my reduction process can completely decolorize solutions of these polymers, regardless of their initial color as made, it greatly simplifies the making of color-matched objects by incorporation of dyes or pigments because of the uniformity of the initial color of the polymers from batch to batch, when treated by my process.

Obvious modifications to those stated above can be made. For example, fillers, dyes, pigments, lubricants, other stabilizers, etc., can be incorporated into the compositions prior to the final shaping. Since the polymers are soluble in many readily available solvents, e.g., xylene, benzene, chloroform, etc., solutions of these polymers can be used for protective coatings on substrates or to provide electrical insulation on metal conductors. These and other modifications will be readily apparent to those skilled in the art and are included within the scope of the appended claims.

What I claim as new and desire by Letters Patent of the United States is:

1. In the process of capping poly(phenylene oxides) at an elevated temperature and for a time sufficient to generate incipient hydroxyl groups and wherein the hydroxyl groups of the polymer are reacted with a material capable of reacting with said hydroxyl groups to form a substituent substantially inert to an oxygen containing atmosphere, the improvement wherein the color of the polymer is substantially diminished by reacting the polymer in solution with a reducing agent selected from the group consisting of zinc, tin, aluminum, cadmium, magnesium, and combinations of at least one of these metals with a carboxylic acid selected from the group consisting of lower alkanoic acids and benzoic acid, said reducing reaction being carried out no later than said capping reaction.

2. The improvement as in claim 1 wherein the reaction with the metal is carried out prior to the capping reaction.

3. The improvement as in claim 1 wherein the reaction with the metal is carried out simultaneously with the capping reaction.

4. The improvement as in claim 1 wherein the metal is zinc.

5. The improvement as in claim 1 wherein the reducing agent is a combination of zinc and a lower alkanoic acid or benzoic acid.

6. The improvement as in claim 1 wherein the reducing agent is a combination of zinc and a $C_{2-5}$ alkanoic acid.

7. The improvement as in claim 1 wherein the reducing agent is a combination of zinc and a $C_{2-5}$ alkanoic acid and the reaction with the reducing agent is carried out simultaneously with the capping reaction using as the capping agent the anhydride of the alkanoic acid used in combination with zinc as the reducing agent.

8. The improvement as in claim 1 wherein the reducing agent is a combination of zinc and acetic acid and the reaction with the reducing agent is carried out simultaneously with the capping reaction using acetic anhydride as the capping agent.

9. The essentially colorless, stabilized, poly(phenylene oxides) produced by the process of claim 8.

References Cited

UNITED STATES PATENTS 3,402,143　9/1968　Hay ---------------- 260—47

FOREIGN PATENTS 6,704,682　6/1967　Netherlands.

WILLIAM H. SHORT, Primary Examiner

M. GOLDSTEIN, Assistant Examiner